April 19, 1949.                    F. H. KAYLER                    2,468,013
                              FIFTH-WHEEL MOUNTING
                              Filed Aug. 31, 1946

INVENTOR.
FRANK H. KAYLER
BY
        ATTORNEY

Patented Apr. 19, 1949

2,468,013

UNITED STATES PATENT OFFICE 2,468,013

FIFTH-WHEEL MOUNTING

Frank H. Kayler, Alliance, Ohio, assignor to American Steel Foundries, Chicago, Ill., a corporation of New Jersey Application August 31, 1946, Serial No. 694,239

13 Claims. (Cl. 280—33.05)

My invention relates to tractor trailer devices and more particularly to a novel improvement in a mounting bracket for a fifth wheel.

In previous designs of saddle type mounting brackets for fifth wheels, the top or plate portion of the bearing has been considerable less than 180°, usually about 120°.

This has caused the longitudinal forces acting on the plate to tend to wedge the plate upwardly since the plate bearing was seated on a portion of the supporting bracket bearing far enough above the center thereof whereby the engaging surfaces of said bearing approximated an incline and any free play in the connection permitted some wedging movement which resulted in wear.

My improvement in this type of mounting bracket consists in having the saddle bearing of the plate cover substantially 180° of the supporting bracket bearing, whereby the longitudinal forces acting on the fifth wheel member are directed against the side of the supporting bracket bearing or closer to the longitudinal center line thereof where radius bearing does not produce a vertical wedging action.

Another object of my invention is to eliminate in a saddle type bracket mounting for a fifth wheel free slack movement between the supporting bracket and the saddle or plate bracket mounted thereon. This I accomplish by providing a spring which holds both brackets together under substantially constant pressure, and prevents free slack movement therebetween in any direction.

A further object of my invention is to provide a novel lubricating system for the brackets described, said system including a lubricant reservoir with a duct and an opening leading therefrom for directing lubricant to the engaging parts of said brackets.

A still further object of my invention is to provide interengaging stops on the supporting and supported brackets to limit downward angling of the plate when the wheel is uncoupled from the trailer.

Referring to the drawing, Figure 1 is a half top plan view of a fifth wheel mounting embodying my invention, the other half thereof being similarly arranged;

Figure 1:
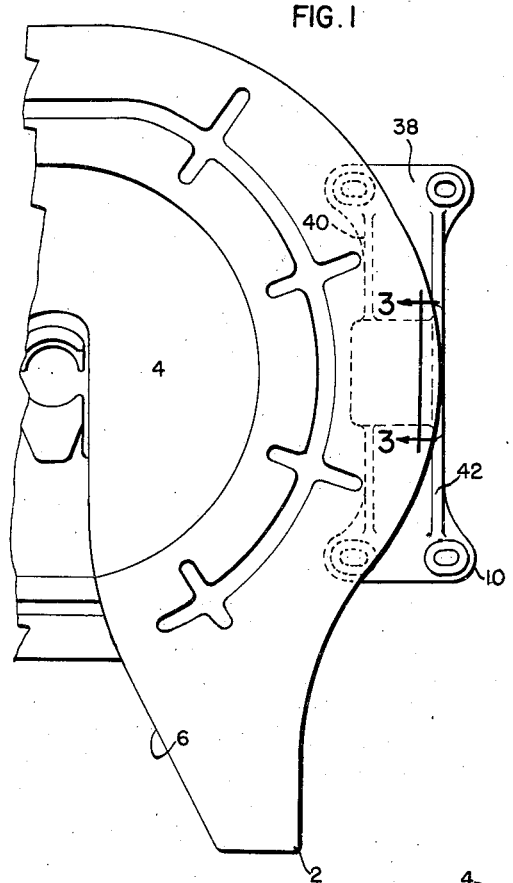
Figure 2:
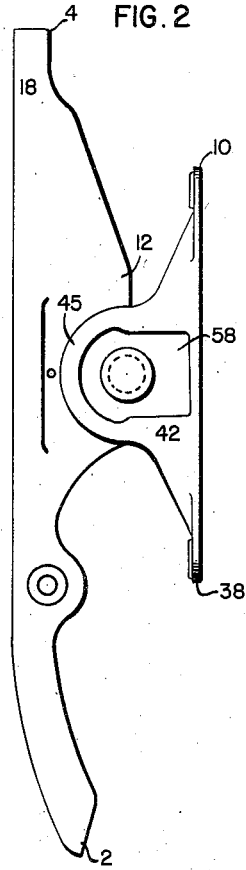
Figure 2 is a side elevation of the structure shown in Figure 1.

Describing my invention in detail, the fifth wheel generally designated 2 comprises a flat wheel plate 4 bifurcated as at 6 to receive an engaging member (not shown) on the trailer for interlocking with the fifth wheel to couple the tractor with the trailer. On each side of the tractor truck frame (not shown) the fifth wheel may be pivotally supported from the bracket 10 secured to said frame in any conventional manner. Each pivotal connection for said fifth wheel includes a downwardly projecting plate or saddle bracket 12 mounted at opposite sides of said wheel plate 4, each of said saddle brackets being of skeletal form and having spaced transverse vertical webs 14, 14 (Figure 3) merging with the longitudinal vertical web 16 (Figure 4) integrally formed with the top chord 18 of the plate 4. Integrally formed with the lower edge of the web 16 and extending between the transverse webs 14, 14 and merging with the lower edges thereof is the arcuate bottom wall 20 (Figure 3) having a depending inner lug 24 (Figure 4). The lug 24 may be formed with a relatively thick center section affording a convenient bearing pad, said lug being provided with a central opening 26 for a purpose hereinafter described.

It may be noted that the web 20 has a concave semicylindrical bottom surface interrupted centrally thereof by the transverse lubricant cavity 28 out of which may lead the lubricant duct 30 merging with the channel 32 in the lug 24, said channel being opened to the opening 26 in said lug, as illustrated in Figure 4.

Leading into the lubricant cavity is the transverse duct 34 extending through the offset portion 36 of the web 16 and providing an opening for application of a grease fitting (not shown) thereto through which the lubricant may be injected into the cavity 28.

Figure 3:
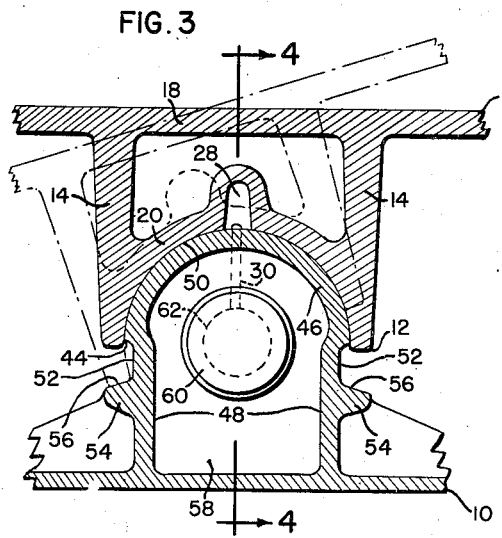
Figure 3 is a fragmentary sectional view taken substantially in the plane as indicated by line 3—3 of Figure 1.
Figure 4:
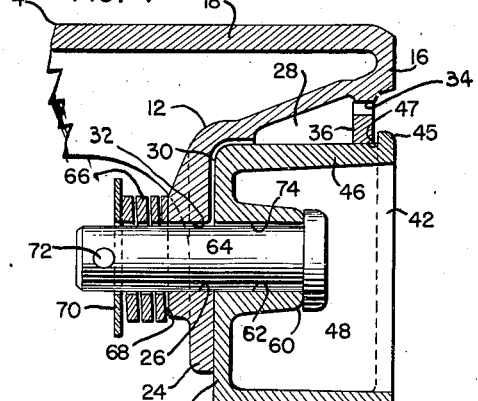
Figure 4 is a further fragmentary sectional view taken in the transverse vertical plane substantially as indicated by line 4—4 of Figure 3.

The supporting bracket, generally indicated at 10, comprises a relatively long rectangular base plate 38 having spaced upstanding longitudinal ribs 40 and 42 tapered upwardly from their ends to merge with the central load bearing portion 44 (Figure 3). The central bearing portion 44 includes a substantially semicircular arcuate wall 46 extending between the flanges 40 and 42 and merging at opposite ends thereof with the spaced upstanding transverse webs 48, 48 (Figure 3) formed on the base plate 38 and having an outer substantially convex semicylindrical bearing surface in abutment as at 50 with the bottom surface of the arcuate wall 20 of the plate bracket 12. It may be noted that the outer flange 42 of the bracket 10 extends a small distance beyond the arcuate wall 46 and forms a radial flange 45 (Figure 4) which engages as at 47 a portion of the offset part 36 of the web 16 by means of which lubricant is retained on said bearing surfaces, said arrangement also substantially protecting said surfaces from dirt which otherwise could lodge therebetween.

Below the juncture of the wall 46 with the webs 48, 48 of the bracket 10 are formed the recesses 52, 52 to provide clearance for the lower ends of the webs 14, 14 on the plate bracket 12, whereby tilting movement is afforded the plate.

Immediately below the recesses 52, 52 are provided the stops 54, 54, being in the form of ribs extending transversely across the webs 48, 48 for abutment against the lower edges of said webs 14, 14 to limit the tilting movement of said plate. It may be noted that the top surfaces 56, 56 of said ribs 54, 54 are tapered downwardly so that the lower edges of the webs 14, 14 may abut thereagainst with the full flat edges thereof in a manner as illustrated in phantom lines in Figure 3.

The outer flange 42 on the bracket 10 may have the central opening 58 and within the opening integrally formed with the flange 40 may be the hollow transverse stud 60 provided with a central opening 62 through which extends the transverse pin 64 (Figure 4), said pin also extending through the aligned opening 26 in the lug 24 and securing the top bracket 12 with the bottom bracket 10. Mounted on the pin is a compression spring 66 seated at one end against the padded portion of the lug 24 as at 68 and at the other end against the washer 70 sleeved over the end of said pin 64. In the pin, adjacent the end thereof, may be provided an opening 72 through which a cotter key (not shown) may extend to secure the spring and the washer on said pin. It may be noted that the opening 62 may be provided with a channel 74 open on the pin 64 and extending longitudinally thereof and communicating with the lubricating duct 30, whereby the lubricant may flow from the lubricant cavity 28 through the duct 30 and into the channel 74 so that the pin 64 may be well lubricated at all times.

It will be appreciated that by the arrangement described above I have provided a novel plate bracket with a novel saddle bearing covering substantially 180° of the supporting bracket bearing, whereby longitudinal forces exerted on the plate do not produce a vertical wedging action, whereby the life of the brackets is substantially prolonged. It may be noted that by means of the spring 66 which is assembled under initial compression, the plate bracket 12 and the supporting bracket 10 are held under pressure so that there is no free slack movement in any direction between said brackets, whereby the wear on these parts is considerably reduced. In other words, the head portion of the pin engages boss 60 of bracket 10 and the spring engages washer 70 at one end and lug 24 of the bracket 12 at the other end. The spring urges the head of the pin against said boss 60 of bracket 10.

It is to be understood that I do not wish to be limited by the exact embodiment of the device shown which is merely by way of illustration and not limitation as various and other forms of the device will, of course, be apparent to those skilled in the art without departing from the spirit of the invention or the scope of the claims.

I claim:

1. A saddle bracket mounting for a fifth wheel member comprising a saddle member on each side of said fifth wheel member, said saddle member having side walls extending transversely of said fifth wheel member and merging at their upper ends with said fifth wheel member, an arcuate wall spaced from said fifth wheel member, extending between said side walls, and presenting a downwardly facing semicylindrical concave bearing surface, a lubricant reservoir in the form of a cavity interrupting said surface, a vertical outer wall projecting downwardly from said fifth wheel member and merging with said side walls at opposite sides thereof, said outer wall having a portion offset inwardly of its longitudinal center line merging at its lower end with the outer edge of said arcuate wall, support means for said saddle member including a central bearing portion in complementary engagement with said surface and having an upturned radial lip on the outer edge thereof engaging an edge of said outer wall offset portion on said saddle member and forming a relatively tight seal therewith for holding lubricant on said surfaces and substantially protecting said surfaces from the entry of dirt therebetween.

2. A supporting bracket for a fifth wheel member comprising a base, spaced integral longitudinal flanges on said base, a transverse arcuate wall between said flanges intermediate said ends, said wall forming a convex semicylindrical outer bearing surface, a saddle bracket on said fifth wheel member comprising spaced transverse webs merging at their upper ends with said member, an arcuate wall extending between said transverse webs and having a concave semicylindrical face complementary to and in abutment with said surface, a transverse lubricant cavity interrupting said face centrally thereof, a depending lug on the inner side of said last-mentioned arcuate wall bearing against one of said flanges on said support bracket, aligned openings in said lug and said last-mentioned flange, a bolt extending through said openings and securing said brackets to each other, and a duct leading from said lubricant cavity to said bolt for directing lubricant thereto.

3. A fifth wheel for tractor-trailer combinations comprising a plate member having spaced bearings, supporting elements for said member having bearing surfaces in complementary engagement with said bearings, said surfaces and bearings accommodating pivoting of said member on a horizontal axis, a pin extending through each element and adjacent portion of said member along said axis, each pin having a head engaging the associated element on a side remote from the adjacent portion of said member, and resilient means associated with each pin and reacting thereagainst and against the adjacent portion of said member on a side thereof remote from the associated element, each of said resilient means urging the head on the related pin into said engagement with the associated element, said resilient means and pins holding said member and elements against relative free slack movement in any direction including free pivotal movement.

4. In tractor and trailer vehicles, coupling means comprising a fifth wheel element, mounting means therefor, said means including spaced saddle members on said fifth wheel element at opposite sides thereof and having concave semicylindrical bearing portions, supporting brackets on said tractor affording seats for said portions on complementary bearing surfaces thereon, recesses below said bearing surfaces on said brackets for accommodating certain portions of said members to permit pivotal movement of said element on said brackets, stop lugs spaced from said surfaces and disposed below said recesses and presenting downwardly diverging flat faces, and flat faces on said members adjacent said lugs adapted to have flat face engagement therewith for limiting pivotal movement of said element.

5. In a tractor and trailer combination, a fifth wheel member having on opposite sides thereof depending saddle brackets with arcuate bottom walls presenting semicylindrical concave bearing surfaces, supporting brackets for said fifth wheel member having upstanding means with complementary bearing surfaces engaging said first-mentioned surfaces, securing means for said saddle brackets and supporting brackets, said securing means comprising a pin extending through aligned openings in said brackets, said openings being spaced radially from said surfaces, lubricant cavities interrupting certain of said surfaces, and lubricant passageways in said openings each communicating with the adjacent cavity.

6. Pivotal mounting means for connecting a fifth wheel member to a supporting frame comprising a bracket having a convex semicircular load bearing portion, complementary means on said fifth wheel member seated on said bearing portion and engageable along the full semicircular face thereof, and stop means on said bracket adapted for abutment with certain portions of said second-mentioned means to limit pivotal movement of said fifth wheel member on said load bearing portion, said stop means being in the form of lugs spaced below and projecting outwardly in opposite directions at opposite sides of said load bearing portion on said bracket and presenting sloping faces adapted for flat face abutment with complementary faces on said certain portions.

7. A saddle bracket for a fifth wheel member comprising spaced transverse webs merging at their upper ends with said member, and an arcuate wall extending between said webs and merging at opposite sides thereof with the lower ends of said webs, said wall presenting a semicylindrical concave bearing face adapted for complementary engagement with a supporting bracket bearing associated therewith, a lubricant cavity interrupting said face, a web extending from said wall and having a pin opening therein, and a channel in said web communicating with said cavity and opening for lubricating an associated pin in said opening.

8. Pivotal mounting means for connecting a fifth wheel member to a supporting frame comprising a bracket with a curved load bearing portion, complementary bearing means on said fifth wheel member seated on said bearing portion, a lubricant reservoir in said last-mentioned means, said reservoir being open to said bearing portion on said bracket, means connecting said bearing means to said bearing portion, and a passageway communicating with said reservoir and the connecting means affording communication for lubricant from said reservoir to said connecting means.

9. A fifth wheel comprising an element with spaced bearing portions, bearing members for supporting said element in complementary engagement with said portions along curved surfaces, said portions and members accommodating pivotal movement of said element on a substantially horizontal axis, means connecting each bearing member with the associated portion at said axis, a lubricant cavity in each portion communicating with the adjacent surfaces, and a channel on each portion between the same and the associated member communicating with the adjacent of said means affording a passageway for lubricant from said cavity to said means.

10. In a coupling assembly, a fifth wheel member having spaced bearing portions, bearing elements for supporting said member in complementary engagement with said portions, lubricant reservoirs in said portions communicating with the engaging surfaces on said portions and elements, pivot means connecting said portions with said elements at points spaced radially inwardly of said surfaces, and channels formed in said portions and elements extending along said means in the areas of engagement therewith and communicating with said reservoirs.

11. In a coupling assembly, a fifth wheel member having a bearing element, a support element for said member in complementary engagement with said bearing element along curved surfaces accommodating pivotal movement of said member, a lubricant cavity in one of said elements communicating with said surfaces, securing means connecting said elements at their axis of rotation, and conduit means in said elements communicating with said cavity and with said securing means at the points of engagement thereof with said elements.

12. In a coupling arrangement, a fifth wheel element having a member with a bearing surface, a support for said element having a surface in engagement with said bearing surface, said surfaces being arranged to accommodate rotation of said element, a lubricant reservoir in said member communicating with said surfaces, a web on said member adjacent said support and extending radially inwardly toward the axis of rotation of said element, conduit means connected to said reservoir and extending along said bearing surface and continuing on said web at the side thereof adjacent said support, pivot means at the axis of rotation of said fifth wheel and extending through said web and support, and passageways in said support and web opening on the surface of said pivot means adjacent thereto and communicating with said conduit means.

13. In a coupling arrangement, a fifth wheel with spaced bearing elements, a support member for said fifth wheel in bearing engagement with said elements, said elements and member accommodating pivotal movement of said fifth wheel, a rigid portion on each element extending radially inwardly toward the axis of rotation of said fifth wheel adjacent the inboard side of the associated member, pivot means connecting each member to the adjacent web at said axis of rotation, and resilient means mounted on each pivot means and reacting thereagainst and against the related web axially of said axis of rotation and frictionally engaging a portion of said pivot means with the associated member.

FRANK H. KAYLER.

REFERENCES CITED

The following references are of record in the file of this patent:

UNITED STATES PATENTS

| Number | Name | Date |
|---|---|---|
| 1,380,490 | Masury | June 7, 1921 |
| 2,015,313 | Kinne | Sept. 24, 1935 |
| 2,196,537 | Sherman | Apr. 9, 1940 |
| 2,336,939 | Kinne | Dec. 14, 1943 |